June 16, 1964 B. MICHAELS 3,137,200
SELF-THREADING PROJECTOR
Filed Dec. 19, 1960 5 Sheets-Sheet 1
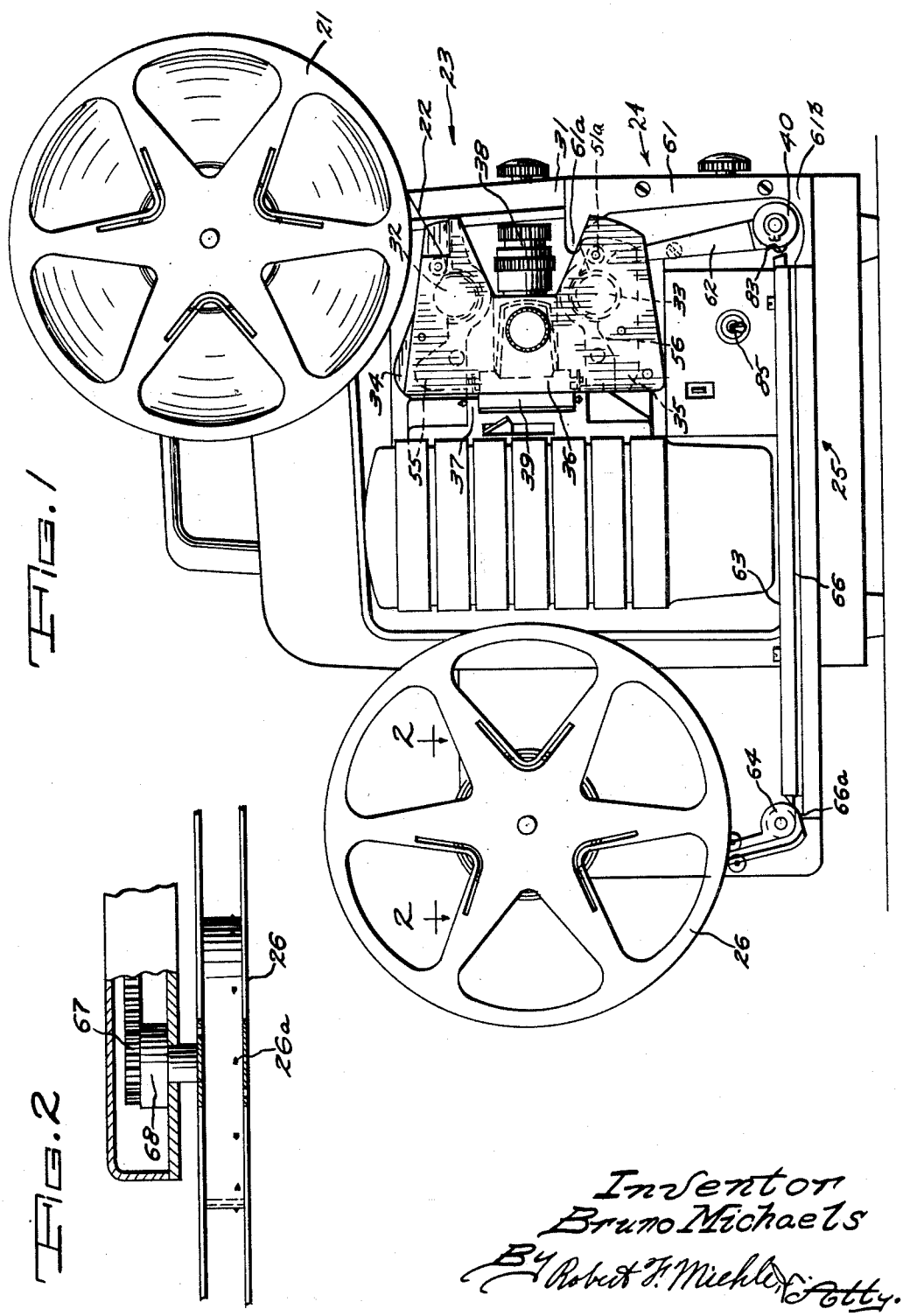
Inventor
Bruno Michaels
By Robert F. Miehle Atty.

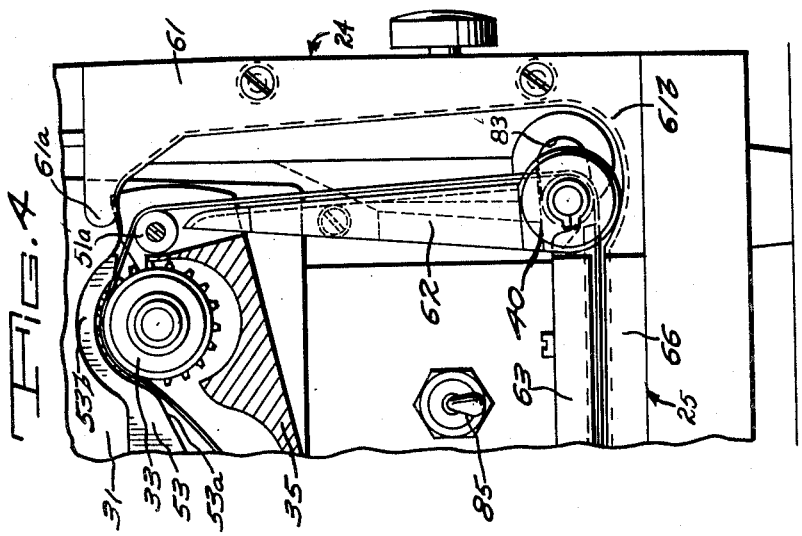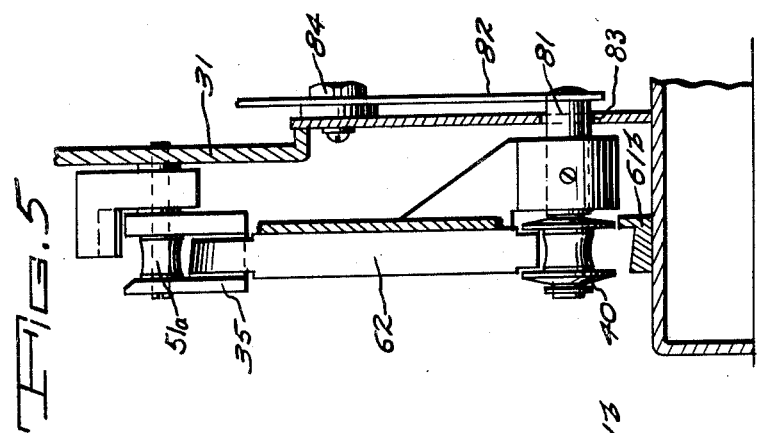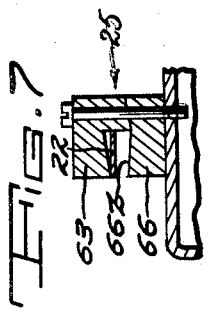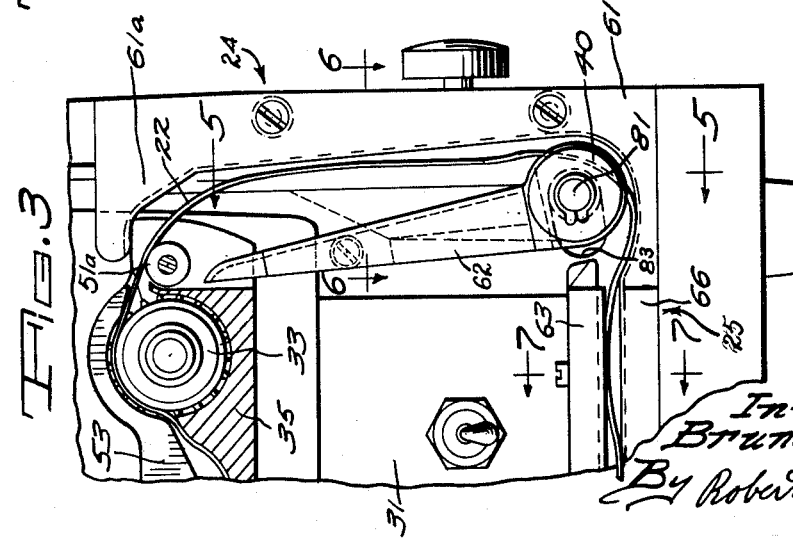

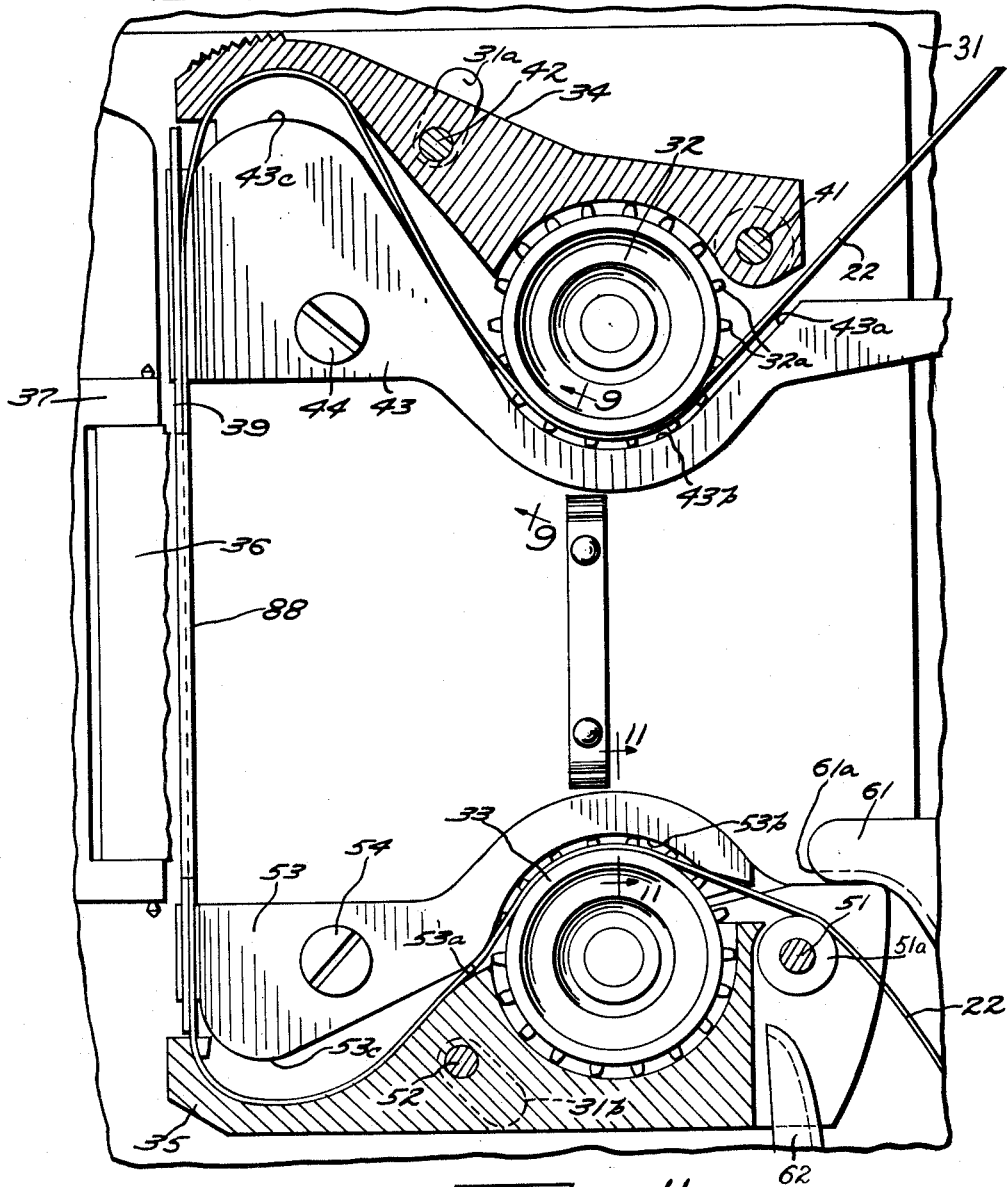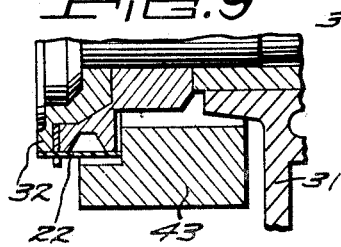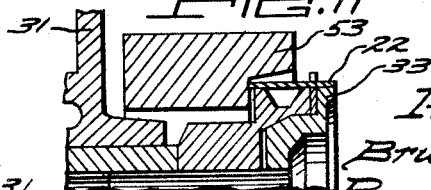

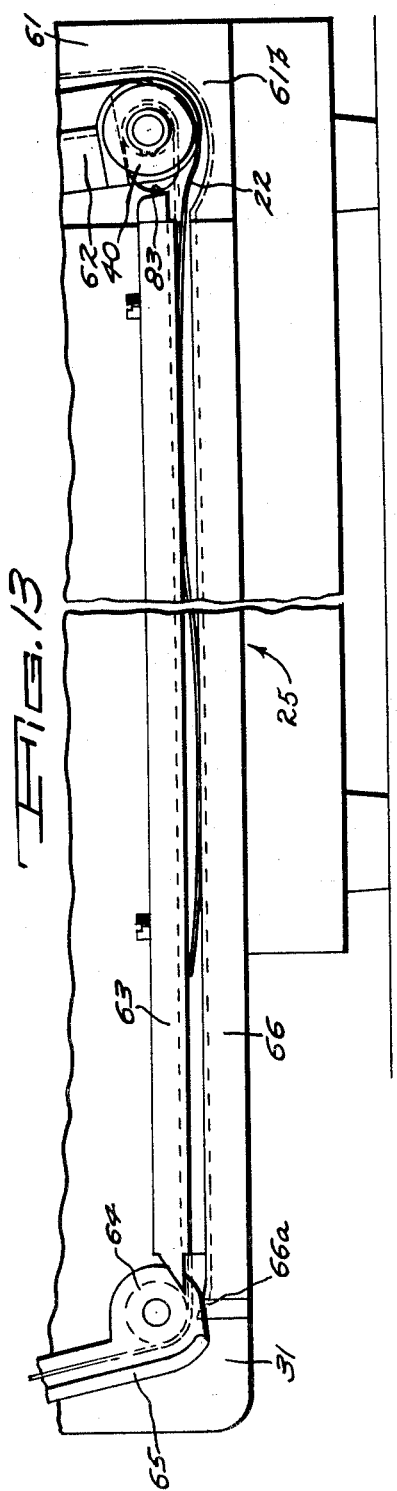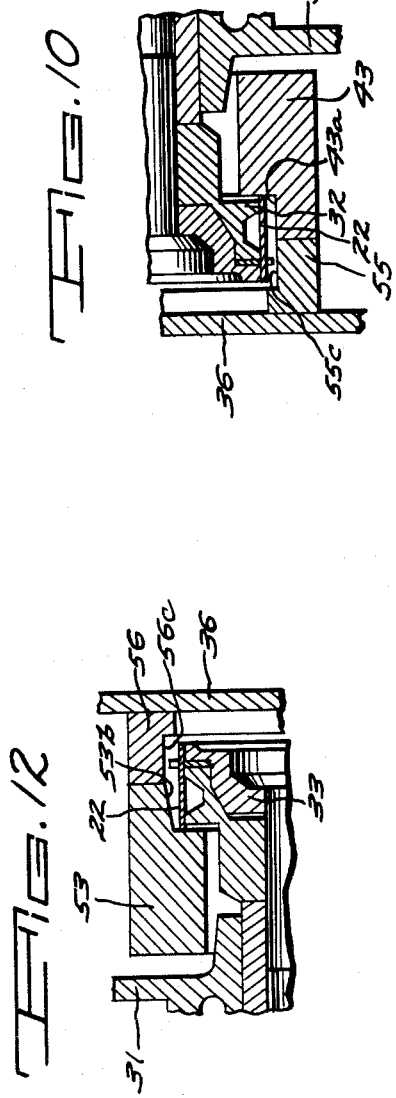

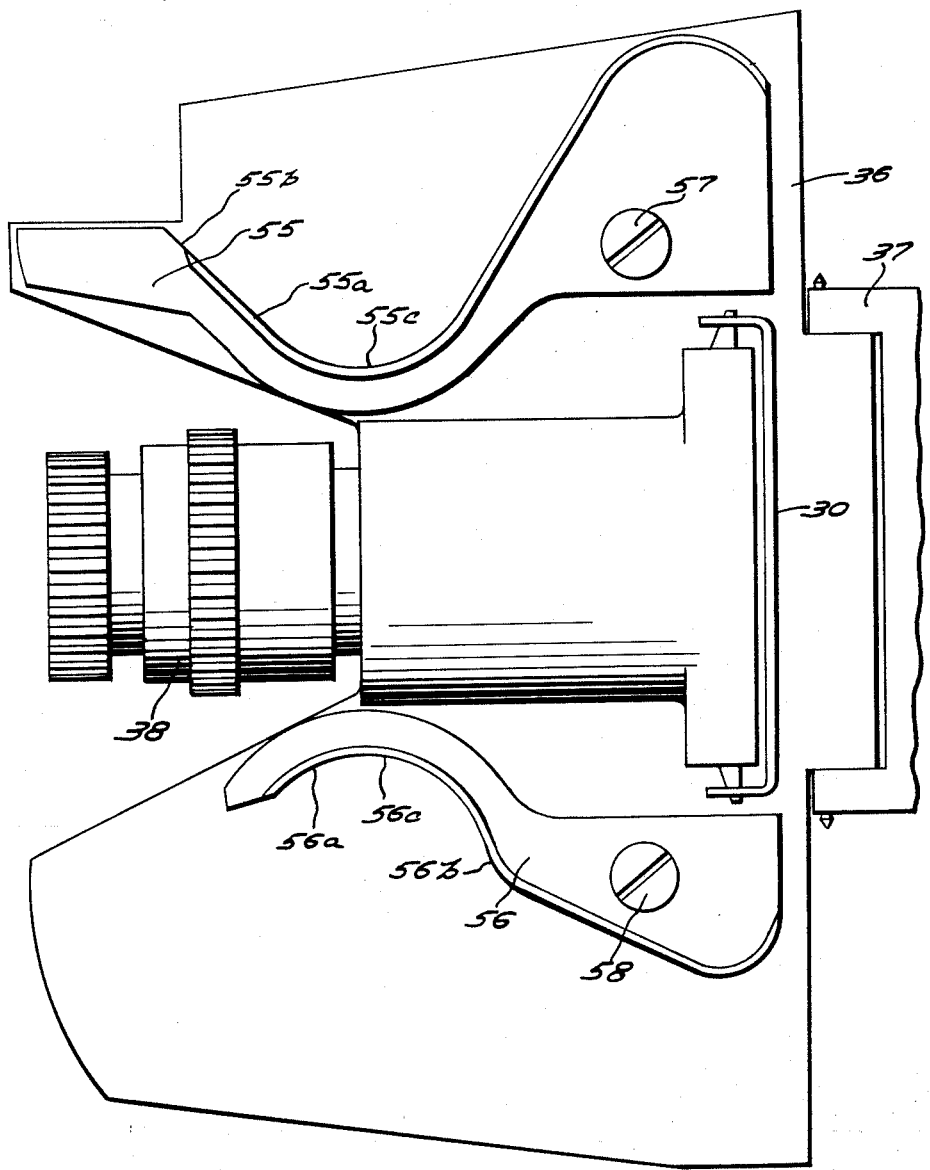

United States Patent Office 3,137,200
Patented June 16, 1964

3,137,200
SELF-THREADING PROJECTOR
Bruno Michaels, Chicago, Ill., assignor to Bell & Howell Company, Chicago, Ill., a corporation of Illinois
Filed Dec. 19, 1960, Ser. No. 76,754
5 Claims. (Cl. 88—17)

This invention relates to a self-threading projector, and more particularly to a self-threading motion picture projector from which an intermediate portion of a film may be readily removed from the gate and repositioned therein.

An object of the invention is to provide a motion picture projector which threads film automatically and permits the portion of the film in the threading and gate portions of the projector to be removed therefrom and replaced therein.

Another object of the invention is to provide a motion picture projector having self-threading means which is partially mounted on gate structure thereof to permit an intermediate portion of the film to be removed from and replaced in the gate structure.

Another object of the invention is to provide a motion picture projector having rollers for guiding film during projection together with threading means extending between the rollers and so positioned that, when the film is taut between the rollers, the film is not in engagement with the threading means.

Another object of the invention is to provide a motion picture projector provided with a hinged gate having self-threading guide sections mounted on the gate and swingable by the gate toward and away from self-threading guide sections mounted on a mounting plate of the projector.

A complete understanding of the invention may be obtained from the following detailed description of a self-threading motion picture projector, when read in conjunction with the appended drawings, in which:

FIG. 1 is a side elevation view of a self-threading motion picture projector forming one embodiment of the invention;

FIG. 2 is a top plan view of the projector of FIG. 1 and taken along line 2—2 of FIG. 1;

FIG. 3 is an enlarged, fragmentary, side elevation view of a portion of the projector of FIG. 1 with the elements thereof in threading positions;

FIG. 4 is a view similar to FIG. 3 but with the elements of the projector in normal operation positions;

FIG. 5 is an enlarged, vertical sectional view taken along line 5—5 of FIG. 3;

FIG. 6 is an enlarged, horizontal sectional view taken along line 6—6 of FIG. 3;

FIG. 7 is an enlarged, vertical sectional view taken along line 7—7 of FIG. 4;

FIG. 8 is an enlarged, fragmentary side elevation view, partially in section, of the self-threading elements of the gate of the projector of FIG. 1 with the gate open;

FIG. 9 is an enlarged, vertical sectional view taken along line 9—9 of FIG. 8 with the gate open;

FIG. 10 is a view similar to FIG. 9 but with the gate closed;

FIG. 11 is an enlarged vertical sectional view taken along line 11—11 of FIG. 8 with the gate open;

FIG. 12 is a view similar to FIG. 11 but with the gate closed;

FIG. 13 is an enlarged, fragmentary side elevation view of a portion of the projector of FIG. 1; and FIG. 14 is an enlarged, fragmentary side elevation view of the gate.

The invention provides a self-threading motion picture projector in which a gate carries self-threading guides thereon and is adapted to move the guides between threading positions and open positions permitting the film to be removed from and replaced in the gate area. The guides may be longitudinally split with sections thereof fixed to and movable with the gate and other sections fixed to a mounting plate to facilitate manual replacement of the film in the gate area and hold the film in engagement with sprockets of the projector. The projector may be provided with guides for self-threading the film from the gate to a take-up reel, and these guides may be open at one side to permit manual removal of the film therefrom and may have camming portions tending to retain the film in the guides as the film is threaded therethrough. Guide rollers may be positioned at the ends of the guides in positions such that, during operation after the threading of the film has been effected, the film does not contact the guides.

Referring now in detail to the drawings, the projector shown therein includes a supply reel 21 (FIG. 1) from which the forward end of a film 22 is drawn, automatically threaded through a gate portion 23 and guide sections 24 and 25 and automatically latched to a take-up reel 26. The intermediate portion of the film between the reels 21 and 26 may be removed manually from the projector to permit removal of sections of the film and splicing, and the intermediate portion of the film may be manually rethreaded through the projector.

The projector includes a mounting plate 31 carrying an upper sprocket 32, a lower sprocket 33 and pivotal outer loop-formers 34 and 35. A gate 36 is hinged to a bracket 37 fixed to the plate 31, and carries an optical objective or projector lens 38. The gate also carries a pressure plate 30 (FIG. 14) of known construction, and, when the gate is closed, guides the film along a known aperture plate 39 (FIG. 8) as the film is advanced by a known intermittent feeding device (not shown). The upper and lower loop-formers 34 and 35 are generally of the same construction and operation as those disclosed and claimed in co-pending application Serial No. 737,429, now Patent No. 3,029,686, assigned to the common assignee, and are pivotal from retracted or open positions to closed or loop-forming positions as shown in FIG. 8, and, when moved to their loop-forming positions, are latched therein until released by movement of a roller 40 (FIG. 1) to the left by structure disclosed in the above co-pending application and co-pending application Serial No. 739,085, now abandoned, assigned to the common assignee. The loop-former 34 is pivotally mounted on the plate 31 by a shaft 41 (FIG. 8) and has a pin 42 projecting through slot 31a in the plate and connected to a known linkage (not shown) behind the plate. The pin 42 is movable laterally upwardly in the slot 31a when the loop-former 34 is moved from its loop-forming position to its retracted position. An upper fixed inner loop-former or guide 43 is secured to the plate 31 in fixed position by screw 44.

The loop-former 35 is pivotally mounted on post or shaft 51, and is connected by a pin 52 rigid thereon to the linkage interconnecting the loop-formers 34 and 35. The pin 52 projects through and is movable laterally in slot 31b in the plate 31. The shaft 51 is carried by the plate 31 and a guide roller 51a is rotatable on the shaft 51. A lower fixed inner loop-former or guide 53 is rigidly mounted on the plate 31 by screw 54.

The gate 36 (FIG. 14) comprises a plate carrying the lens 38 and upper and lower inner guides 55 and 56, which are fixed to the gate 36 by screws 57 and 58. The guides 55 and 56 are of the same shape as the guides 43 and 53, respectively, and fit into face to face, laterally aligned positions with the guides 43 and 53 so that, in effect, when the gate is closed, the guides 43 and 55 may be considered to be a longitudinally split single guide.

Similarly, the guides 55 and 56, when the gate is closed, form a longitudinally split single guide having the same guiding periphery. The guides 55 and 56 have beveled or relieved portions 55a and 56a to provide clearance for the sprockets 32 and 33 (FIG. 1) to permit the guides 55 and 56 (FIG. 14) to be swung between open and closed positions.

In the self-threading operation, the leader end of the film 22 is manually pushed along tapered entrance portions 43a (FIG. 8) and 55b (FIG. 14) of the guides 43 and 55, the teeth 32a (FIG. 8) of the sprocket 32 pick up the perforations in the film and push the film along arcuate sprocket guide portions 43b and 55c which hold the film in engagement with the sprocket. The forward or leader end of the film is pushed by the sprocket 32 along the loop-former 34, which has been closed, between the loop-former 34 and the guides 43 and 55, between the aperture plate 39 and the pressure plate 30, along the lower loop-former 35 into tapered entrance portions 53a and 56b (FIG. 14) of the inner guides 53 and 56 and is picked up and advanced by the sprocket 33 (FIG. 8), sprocket guide portions 53b and 56c (FIG. 14) of the guides 53 and 56 serving to hold the film in engagement with the upper portion of the sprocket 33 (FIG. 8). The sprocket 33 pushes the leader end of the film between the roller 51a and rounded, tapered entrance end 61a of fixed guide 61. The forward end of the film travels downwardly, as viewed in FIG. 1, between the guide 61 and opposing guide 62, between flanged loop-former releasing roller 40 and curved portion 61b, to the left between straight guides 63 and 66, between curved portion 66a and roller 64, up along pivotal guide 65, and into the take-up reel 26, which has teeth 26a which latch the leading end of the film to the take-up reel. The take-up reel is driven by gearing 67 (FIG. 2) and a slipping clutch 68, and tensions the film between the sprocket 33 (FIG. 1) and the take-up reel. This swings the roller 40 to the left to release the loop-formers 34 and 35, which are spring returned to their open positions spaced outwardly from the loops of the film. The projector now is in its run or projecting position. Certain features of the reel 26 and the guide 65 are disclosed and claimed in co-pending application Serial No. 814,894, now Patent No. 3,053,465, assigned to the common assignee.

The guide 61 has a beveled or sloping guide face 61e (FIGS. 5, 6 and 7) which cams the film slightly and constantly toward edge guide surfaces 61f. The guides 62, 63, 65 and 66 are provided with similar camming surfaces 62a, 63a, 65a and 66b. These camming surfaces obviate any edge guiding surface at the opposite edge of the film 22 and permit this side of the composite structure to be open so that the film 22 may be readily removed edgewise from the guiding surfaces for editing, splicing and the like. The rollers 51a and 40 are so positioned that when the film is taut therebetween the film is held out of contact with the guides 61 and 62, the rollers projecting into the space between these guides. Similarly, as illustrated in FIG. 13, the rollers 40 and 64 and guides 63 and 66 are so positioned that, during threading when the film is being pushed and is slack, the film engages the guides 63 and 66 as illustrated in full lines and, after the film is latched to the take-up reel 26 (FIG. 1), the film is tensioned and assumes the broken-line position shown in FIG. 13 in which film is guided solely by the rollers 40 and 64 and is held out of contact with the guides 63 and 66.

The roller 40 is mounted rotatably on post 81 (FIGS. 3, 4 and 5) rigidly mounted on lever 82 and projecting through slot 83 in the mounting plate 31. The lever 81 is keyed to and pivotally mounted by shaft 84, and the guide 62 also is keyed to the shaft 81. The lever 82 forms the releasing portion of the linkage interconnecting the loop-formers, and, when the roller 40 is swung by film tension to the left from its position shown in FIG. 3 to the position thereof shown in FIG. 4, the lever releases the interconnecting linkage of the loop-formers so that the loop-formers are spring returned to open or retracted positions as disclosed in the above mentioned co-pending application Serial No. 739,085, now abandoned. As the rollers 40, 51a and 64, or alternately, may start rewind the guide out of the path of the film while the film is tensioned.

If it is desired to remove the film from the projector while the film is still connected to both the supply reel 21 (FIG. 1) and the take-up reel 26, the projector is stopped by switch 85 and the gate 36 is swung open manually. The operator then pushes the film out of engagement with the sprockets 32 and 33 and withdraws the film laterally from the guides 43 and 53 (FIG. 8), the upper end of edge guide 88 being substantially below the guide 43 and the lower end of the guide 88 being substantially above the lower guide 53, thus facilitating edgewise removal of the film from the pressure plate and the ends of the guides 43 and 53. The operator then may withdraw the film laterally from the guides 61, 62, 63, 65 and 66 and the rollers 40, 51a and 64, or alternately, may start rewinding with the film entirely out of the gate but still in the guides 61, 62, 63, 65 and 66 and on the rollers 40 and 64, the film traveling from the rounded end 61a of the guide 61 directly to the supply reel 21.

If the entire intermediate portion of the film between the reels 21 and 26 has been removed for splicing or the like and it is desired to rethread the projector, the film is pushed edgewise back into the guides 61, 62, 63, 65 and 66 the open guides making this a simple operation, and then the film is rethreaded into the gate area of the projector. This is accomplished, the gate 36 being open and the loop-formers 34 and 35 being in their retracted positions, by manually pushing the film over the inner guides 43 and 53 (FIG. 8) leaving loops above and below portions 43c and 53c which are directly opposite the loop-forming portions of the loop-formers 34 and 35. The operator manipulates the film, if necessary, to engage the film with the teeth of the sprockets 32 and 33, and the guides 43 and 53 then hold the film in this position which is illustrated in FIG. 8. Then, the gate 36 is swung closed, the pressure plate 30 engaging the film and the guides 55 and 56 moving into alignment with the guides 43 and 53, respectively to aid these guides in holding the film on the sprockets. The projector then may be again started and projection operation continued.

The film 22 in the above described projector may be threaded and latched to the take-up reel 26 (FIG. 1) merely by inserting the leader end of the film 22 into the entrance portion 43a of the guide 43, and after complete threading, the intermediate portion of the film may be easily removed from and reinserted into either or both the gate area and the several guiding elements between the gate area and the supply and take-up reels.

While the invention is thus described, it is not wished to be limited to the precise details described, as changes may be readily made without departing from the spirit of the invention.

What is claimed is:

1. In a motion picture projector, adapted to automatically thread film for projection, a mounting structure, an aperture plate having an aperture mounted on the mounting structure, at least one sprocket mounted for rotation on a portion of the structure for advancing film to the aperture plate, a gate pivotally mounted on the mounting structure for movement toward and away from a closed position parallel to said portion of the structure, and guide means including a sprocket guide portion mounted on the gate and adapted to cooperate with said at least one sprocket to hold film in mesh with the sprocket to enable the film to be automatically threaded when the gate is in its closed position, and to release the threaded film so that the film can be easily removed from the sprocket when the gate is pivotally moved to a nonparallel open position relative to said portion of the structure.

2. In a motion picture projector adapted for automatically threading a film for projection, a mounting structure, upper and lower sprockets mounted for rotation on the mounting structure for advancing film, a normally stationary aperture plate mounted on the structure and having an aperture, a gate mounted on the structure for pivotal movement relative to the aperture plate, a pressure plate carried by the gate and adapted to cooperate with the aperture plate when the gate is closed, an upper loop former mounted on the structure adjacent the aperture plate and above the aperture, a lower loop former mounted on the structure adjacent to the aperture plate and below the aperture, an upper sprocket guide fixed to the gate and adapted to hold the film in engagement with the lower peripheral portion of the upper sprocket when the gate is closed, said upper sprocket guide being movable away from the upper sprocket when the gate is opened, a lower sprocket guide fixed to the gate and adapted to hold the film in engagement with the upper peripheral portion of the lower sprocket when the gate is closed, said lower sprocket guide being movable away from the lower sprocket when the gate is opened, whereby a film may be easily removed from the sprockets and aperture plate when the gate is opened.

3. The motion picture projector of claim 1 wherein the guide means further includes an inner loop forming portion mounted on the mounting structure and an outer loop former mounted movably on the mounting structure for coacting with the inner loop forming portion to thread a film.

4. The motion picture projector of claim 1 wherein the said at least one sprocket has a plurality of spaced film perforation engaging teeth positioned near the end of the sprocket more remote from the structure, said guide means further including an additional sprocket guide portion fixedly mounted on the structure in a position adjacent to a portion of the sprocket axially spaced along the sprocket from said teeth, said additional sprocket guide portion being adapted to cooperate with said sprocket guide portion on the gate for holding a film in mesh with the sprocket when the gate is moved to its closed position, said additional sprocket guide portion having a length less than the width of the film whereby a film may be easily removed from a meshing relationship with the teeth of the sprocket when the gate is in its open position by unmeshing the film perforations from the teeth and pulling the film edgewise from its position between the sprocket and the additional sprocket guide portion.

5. The motion picture projector of claim 1 and including; a film supply reel mounted at the upper forward portion of the structure, a film take-up reel mounted at the rear of the structure, a second sprocket mounted for rotation on a portion of the structure for advancing film from the aperture plate, and additional guide means mounted on the structure for guiding film from the second sprocket to the take-up reel, said additional guide means being open at the side opposite the structure to permit edgewise withdrawal of the film therefrom.

References Cited in the file of this patent
UNITED STATES PATENTS

| | | |
|---|---|---|
| 1,973,477 | Fritts | Sept. 11, 1934 |
| 2,051,788 | Foster et al. | Aug. 18, 1936 |
| 2,114,608 | Ross | Apr. 19, 1938 |
| 2,327,776 | Fairbanks et al. | Aug. 24, 1943 |
| 3,063,610 | Briskin | Nov. 13, 1962 |